United States Patent
Yang et al.

(10) Patent No.: US 10,271,105 B2
(45) Date of Patent: Apr. 23, 2019

(54) METHOD FOR PLAYING VIDEO, CLIENT, AND COMPUTER STORAGE MEDIUM

(71) Applicant: TENCENT TECHNOLOGY (SHENZHEN) COMPANY LIMITED, Shenzhen (CN)

(72) Inventors: Hao Yang, Shenzhen (CN); Suibin Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/658,053

(22) Filed: Jul. 24, 2017

(65) Prior Publication Data

US 2017/0324998 A1    Nov. 9, 2017

Related U.S. Application Data

(63) Continuation of application No. PCT/CN2016/079888, filed on Apr. 21, 2016.

(30) Foreign Application Priority Data

May 26, 2015    (CN) .......................... 2015 1 0276527

(51) Int. Cl.
*H04N 21/472*    (2011.01)
*H04N 21/44*    (2011.01)
(Continued)

(52) U.S. Cl.
CPC ..... *H04N 21/47217* (2013.01); *H04N 21/431* (2013.01); *H04N 21/432* (2013.01);
(Continued)

(58) Field of Classification Search
CPC combination set(s) only.
See application file for complete search history.

(56) References Cited

U.S. PATENT DOCUMENTS 6,415,326 B1 * 7/2002 Gupta ................ H04N 7/17336
348/E7.073
8,875,175 B1 * 10/2014 McCoy ................ H04N 21/812
348/14.02
(Continued)

FOREIGN PATENT DOCUMENTS

CN    101909160 A    12/2010
CN    102347043 A    2/2012
(Continued)

OTHER PUBLICATIONS

The World Intellectual Property Organization (WIPO) International Search Report for PCT/CN2016/079888 dated Jul. 27, 2016.
(Continued)

*Primary Examiner* — Alexander Gee
(74) *Attorney, Agent, or Firm* — Anova Law Group, PLLC

(57) ABSTRACT

Embodiments of the present disclosure disclose a method for playing a video and a client. The method includes: detecting a video switching operation when a first video is currently being played at a first playback progress; pausing playback of the first video in response to the detected video switching operation; obtaining the first playback progress of the first video; determining a second playback progress of a second video according to the first playback progress, the second video being a video that is different from the first video; and playing the second video according to the second playback progress. The embodiments of the present disclosure also disclose a computer storage medium.

17 Claims, 4 Drawing Sheets

(51) Int. Cl.
*H04N 21/845* (2011.01)
*H04N 21/432* (2011.01)
*H04N 21/433* (2011.01)
*H04N 21/431* (2011.01)

(52) U.S. Cl.
CPC ....... *H04N 21/433* (2013.01); *H04N 21/4325* (2013.01); *H04N 21/4333* (2013.01); *H04N 21/44016* (2013.01); *H04N 21/8455* (2013.01); *H04N 21/8456* (2013.01)

(56) References Cited

U.S. PATENT DOCUMENTS

| | | | | |
|---|---|---|---|---|
| 2002/0120752 | A1* | 8/2002 | Logan | H04H 60/27 |
| | | | | 709/228 |
| 2002/0133247 | A1* | 9/2002 | Smith | H04L 29/06 |
| | | | | 700/94 |
| 2010/0077441 | A1* | 3/2010 | Thomas | G06F 3/1415 |
| | | | | 725/133 |
| 2012/0197419 | A1 | 8/2012 | Dhruv et al. | |
| 2015/0294496 | A1* | 10/2015 | Medasani | H04N 7/181 |
| | | | | 348/159 |

FOREIGN PATENT DOCUMENTS

| | | |
|---|---|---|
| CN | 103000202 A | 3/2013 |
| CN | 103037244 A | 4/2013 |
| CN | 103997680 A | 8/2014 |
| CN | 104093056 A | 10/2014 |
| CN | 104301781 A | 1/2015 |
| CN | 104469521 A | 3/2015 |
| CN | 104616675 A | 5/2015 |
| CN | 104837051 A | 8/2015 |

OTHER PUBLICATIONS

The State Intellectual Property Office of the People's Republic of China (SIPO) Office Action 1 for 201510276527.1 dated Jun. 19, 2017.

* cited by examiner

METHOD FOR PLAYING VIDEO, CLIENT, AND COMPUTER STORAGE MEDIUM

CROSS-REFERENCES TO RELATED APPLICATION

This application is a continuation application of PCT Patent Application No. PCT/CN2016/079888, filed on Apr. 21, 2016, which claims priority to Chinese Patent Application No. 201510276527.1, entitled "METHOD FOR PLAYING VIDEO, CLIENT, AND COMPUTER STORAGE MEDIUM," filed on May 26, 2015, the entire contents of both of which are incorporated herein by reference.

FIELD OF THE TECHNOLOGY

The present disclosure relates to the field of information processing, and in particular, to a method for playing a video, a client, and a computer storage medium.

BACKGROUND OF THE DISCLOSURE

In the existing technology, after a video is recorded, a user generally can play the video only according to the produced video when playing the video by using a client (such as a mobile phone, a tablet computer, a television, and/or a computer). In a process of playing the video, the user can control only parameters such as a size of a video playback area, a video playback speed, and a video playback progress, but the user cannot control content-to-be-played of the video.

Obviously, such the video playback method is dull and is weak in controllability by a user, and the client has a low intelligence, which finally cause poor use satisfaction of the user.

SUMMARY

In view of this, embodiments of the present disclosure are expected to provide a method for playing a video, a client, and a computer storage medium, so as to partially resolve an existing problem of low intelligence of a client for playing a video and poor use satisfaction of a user.

A first aspect of the embodiments of the present disclosure provides a method for playing a video, including: detecting a video switching operation when a first video is currently being played at a first playback progress; pausing playback of the first video in response to the detected video switching operation; obtaining the first playback progress of the first video; determining a second playback progress of a second video according to the first playback progress, the second video being a video that is different from the first video; and playing the second video according to the second playback progress.

Optionally, the method further includes: buffering at least two videos, where the at least two videos includes the first video and the second video; and the detecting a video switching operation includes: after the at least two videos are buffered, playing the first video and detecting the video switching operation.

Optionally, the method further includes: obtaining an operation parameter of the video switching operation; and determining a video in the at least two videos as the second video according to the operation parameter.

Optionally, playing the first video includes: drawing image information of the first video on a first canvas; and the playing the second video includes: drawing image information of the second video on the first canvas.

Optionally, the method further includes: detecting the video switching operation when the second video is being played; obtaining a current playback progress of the second video if an acting time of the video switching operation ends, where the current playback progress of the second video is a third playback progress; determining, according to the third playback progress, a fourth playback progress for resuming playing the first video; and playing the first video according to the fourth playback progress.

Optionally, an $n^{th}$ frame of image of the first video is a first part of an $n^{th}$ frame of image of a third video; and an $n^{th}$ frame of image of the second video is a second part of the $n^{th}$ frame of image of the third video, where n is an integer no less than 1.

Optionally, the method is applied to a client including a display module; the first video is displayed in a first area of a first display page; the second video is displayed in a second area of the first display page; and the playing the second video includes: controlling the display module to display the second area, and hide the first area or use specified information to cover the first area.

Optionally, the determining a second playback progress of a second video according to the first playback progress includes: determining a playback progress conversion ratio according to a first playback duration of the first video and a second playback duration of the second video; and determining the second playback progress according to the playback progress conversion ratio and the first playback progress.

A second aspect of the embodiments of the present disclosure provides a client terminal, including: a detecting unit, configured to detect a video switching operation when a first video is currently being played at a first playback progress; a first obtaining unit, configured to pause playback of the first video in response to the detected video switching operation and obtain the first playback progress of the first video; a determining unit, configured to determine a second playback progress of a second video according to the first playback progress, the second video being a video that is different from the first video; and a playback unit, configured to play the second video according to the second playback progress.

Optionally, the client further includes: a buffering unit, configured to buffer at least two videos, where the at least two videos includes the first video and the second video; and the playback unit, configured to play the first video and detect the video switching operation after the at least two videos are buffered.

Optionally, the client terminal further includes: a second obtaining unit, configured to obtain an operation parameter of the video switching operation; and a selecting unit, configured to determine a video in the at least two videos as the second video according to the operation parameter.

Optionally, the playback unit is configured to draw image information of the first video on a first canvas when the first video is being played; and draw image information of the second video on the first canvas when the second video is being played.

Optionally, the detecting unit is further configured to detect the video switching operation when the second video is being played; the first obtaining unit is further configured to obtain a current playback progress of the second video if an acting time of the video switching operation ends, where the current playback progress of the second video is a third playback progress; the determining unit is further configured to determine, according to the third playback progress, a fourth playback progress for resuming playing the first video; and the playback unit is further configured to play the first video according to the fourth playback progress.

Optionally, an $n^{th}$ frame of image of the first video is a first part of an $n^{th}$ frame of image of a third video; and an $n^{th}$ frame of image of the second video is a second part of the $n^{th}$ frame of image of the third video, where n is an integer no less than 1.

Optionally, the playback unit includes a display module; the first video is displayed in a first area of a first display page; the second video is displayed in a second area of the first display page; and the playback unit is specifically configured to control the display module to display the second area, and hide the first area or use specified information to cover the first area.

Optionally, the determining unit is configured to determine a playback progress conversion ratio according to a first playback duration of the first video and a second playback duration of the second video, and determine the second playback progress according to the playback progress conversion ratio and the first playback progress.

A third aspect of the embodiments of the present disclosure provides a computer storage medium, the computer storage medium storing a computer executable instruction, and the computer executable instruction being configured to perform at least one of the foregoing methods for playing a video.

A fourth aspect of the embodiments of the present disclosure provides a method for playing a video. The method may include: playing a first video at a first location on a graphical user interface of a client terminal; displaying, on the graphical user interface, multiple icons indicating how to input a video switching operation; detecting the video switching operation when the first video is currently being played at a first playback progress, wherein a first icon of the multiple icons triggers the video switching operation when the first icon or a key corresponding to the first icon is pressed or clicked; pausing playback of the first video in response to the detected video switching operation; determining a second playback progress of a second video according to the first playback progress, the second video being a video different from the first video; and playing the second video according to the second playback progress at the first location on the graphical user interface.

Optionally, the method further includes: before detecting the video switching operation, buffering at least two videos, each buffered video being associated with one of the multiple icons. Further, detecting the video switching operation when the first video is currently being played at the first playback progress further includes: identifying, from the at least two buffered videos, the second video associated with the first icon.

Optionally, when the second video is being played, in response to a second icon or a second key corresponding to the second icon being selected or clicked, the video switching operation is triggered to play the first video.

Optionally, when the second video is being played, in response to the first icon or the first key corresponding to the first icon being released, the video switching operation is triggered to play the first video.

By means of the method for playing a video, the client, and the computer storage medium in the embodiments of the present disclosure, a video switching operation is detected when a first video is being played; after the video switching operation is detected, an initial playback progress (that is, the second playback progress) of a second video is determined according to a playback progress of the first video, and the second video is switched to play. In this way, the client may implement, by detecting the video switching operation input by a user, the first video and the second video are alternated to be played, so as to enrich video playback forms and playback control forms, improve controllability of video playback of the user and intelligence of the client, thereby improving use satisfaction of the user.

DESCRIPTION OF EMBODIMENTS

The following further describes technical solutions of the present disclosure in detail with reference to the accompanying drawings of the specification and specific embodiments. It should be understood that the following described preferred embodiments are merely used to describe and explain the present disclosure but are not intended to limit the present disclosure.

Figure 6:
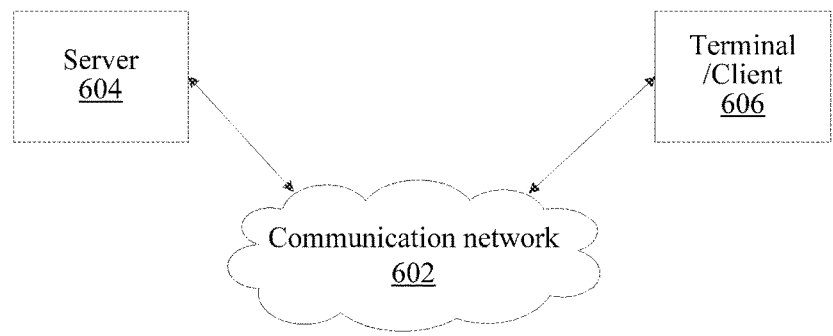
FIG. 6 illustrates an exemplary operating environment incorporating certain disclosed embodiments.

FIG. 6 depicts an exemplary environment 600 incorporating the exemplary methods and mobile terminals in accordance with various disclosed embodiments. As shown in FIG. 6, the environment 600 can include a server 604, a terminal 606, and a communication network 602. The server 604 and the terminal 606 may be coupled through the communication network 602 for information exchange, e.g., webpage browsing, video information transmission, etc. Although only one terminal 606 and one server 604 are shown in the environment 600, any number of terminals 606 or servers 604 may be included, and other devices may also be included.

The communication network 602 may include any appropriate type of communication network for providing network connections to the server 604 and terminal 606 or among multiple servers 604 or terminals 606. For example, the communication network 602 may include the Internet or other types of computer networks or telecommunication networks, either wired or wireless.

A terminal, as used herein, may refer to any appropriate user terminal with certain computing capabilities, e.g., a personal computer (PC), a work station computer, a handheld computing device (e.g., a tablet), a mobile terminal (e.g., a mobile phone or a smart phone), or any other user-side computing device.

A server, as used herein, may refer to one or more server computers configured to provide certain server functionalities, e.g., network data storage and database management.

A server may also include one or more processors to execute computer programs in parallel.

Figure 7:
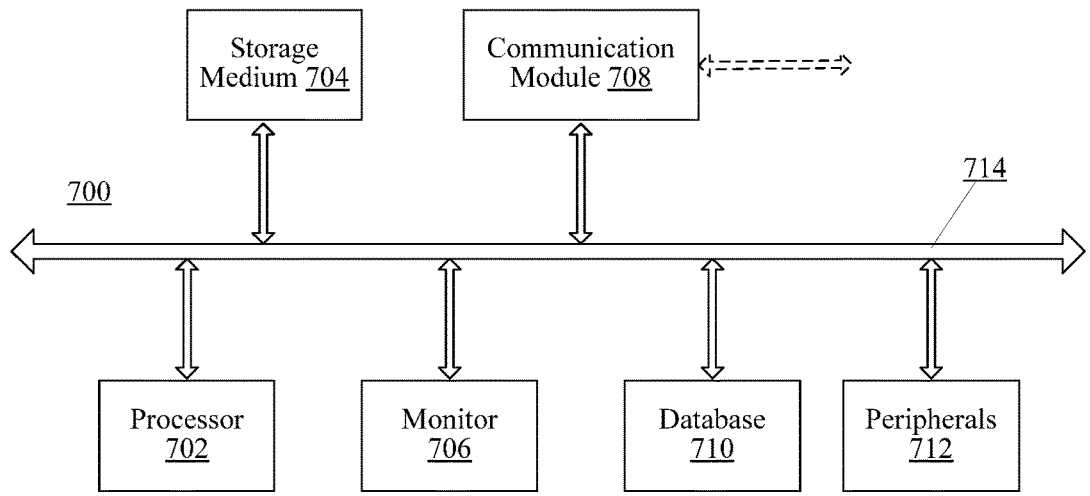
FIG. 7 illustrates a block diagram of an exemplary computer system consistent with the disclosed embodiments.

The server 604 and the terminal 606 may be implemented on any appropriate computing platform. FIG. 7 shows a block diagram of an exemplary computing system 700 capable of implementing the server 604 and/or the terminal 606. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes (e.g., rendering a webpage, playing a video, etc.), when executed by the processor 702.

The monitor 706 may include display devices for displaying contents in the computing system 700, e.g., playing a video embedded in a webpage. The peripherals 712 may include I/O devices, e.g., touchscreen, keyboard and mouse for inputting information by a user. The peripherals may also include certain sensors, such as gravity sensors, acceleration sensors, and other types of sensors.

Further, the communication module 708 may include network devices for establishing connections through the communication network 602. The database 710 may include one or more databases for storing certain data and for performing certain operations on the stored data, e.g., retrieving certain videos, etc.

In operation, the terminal 606 may play videos, such as improved webpage refreshing or other webpage operations. The terminal 606 may be configured to provide structures and functions correspondingly for related actions and operations. More particularly, the terminal 606 may play a "double-sided" video embedded in a webpage. The webpage may be hosted by the server 604. The terminal 606 may access and load the webpage (including the video data) based on information transmitted from the server 604 through the communication network 602. The double-sided video refers to, when a video switch operation is detected, the terminal 606 flips a currently playing first video on A side to a second video on B side; and when another switch operation is detected, the terminal 606 flips the currently playing second video on B side back to the first video on A side. Such features can provide engaging information presentation effects, for example, before and after effect of using a product, and features of multiple products belonging to a same product line.

Further, multiple video streams may be introduced to the webpage, and the multiple video streams, after buffering is completed, may be directed to output to a same canvas (html5 canvas). From a viewer's perspective, the multiple video streams are switched and played in a same canvas. Using two video streams as an example, from a webpage developer's perspective, the webpage may be embedded with two hidden video players corresponding to the two video streams, and the two video streams are played at the same time. The canvas element may function as a controller to select one video stream to be presented at a time based on switch instruction from the user. In some embodiments, the multiple video streams are assigned when the webpage is being developed.

Method Embodiment 1

Figure 1:
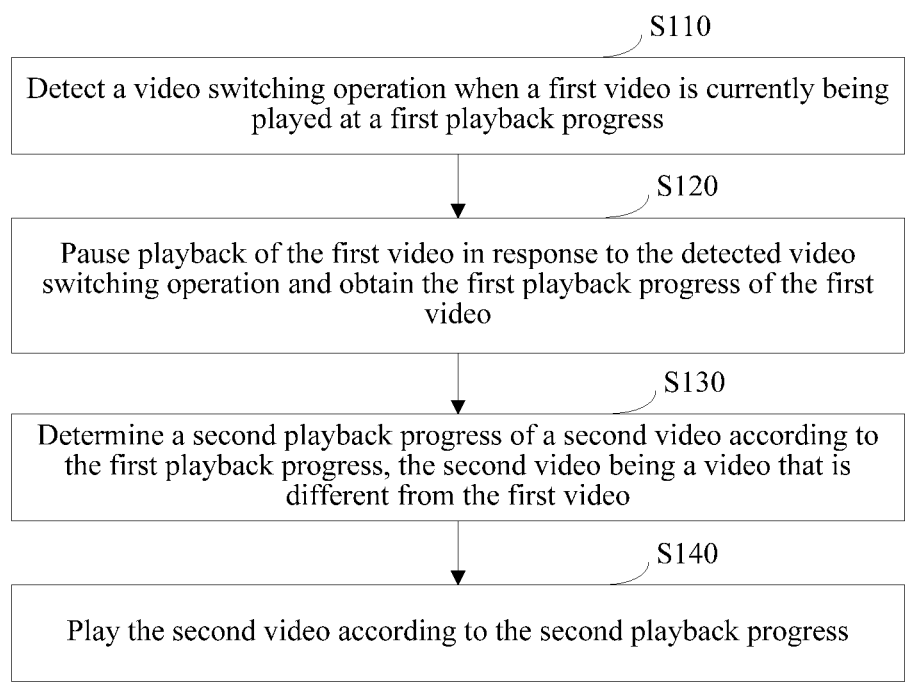
FIG. 1 is a schematic flowchart of a method for playing a video according to an embodiment of the present disclosure.

As shown in FIG. 1, this embodiment provides a method for playing a video, and the method may include the following.

Step S110: Detecting a video switching operation when a first video is currently being played at a first playback progress.

Step S120: Pausing playback of the first video in response to the detected video switching operation; and obtaining the first playback progress of the first video.

Step S130: Determining a second playback progress of a second video according to the first playback progress, the second video being a video that is different from the first video.

Step S140: Playing the second video according to the second playback progress.

The method for playing videos according to this embodiment is mainly applied to a client including a display module. The display module may include various types of screens, such as a liquid crystal display, a projection screen, or an electronic ink screen. The client according to this embodiment may specifically include a first type playback device, that can autonomously control a video playback progress, such as a mobile phone, a tablet computer, a notebook computer, a desktop computer, or a web television. Compared with an existing playback device such as a cable TV that switches a video for playback by switching a channel, these first type playback devices can pause playback of a video and control a playback speed of the video. However, in the existing technology, the first type playback device still cannot perform interesting playback such as alternate video playback, so that intelligence of the client and user satisfaction are not enough. By means of the method for playing a video in this embodiment, the alternate video playback can be implemented.

The detecting a video switching operation may be obtaining, by using a human-computer interaction interface such as a mouse, a touchscreen, or a sound collection module, the video switching operation used by a user.

It is assumed that playback duration of the first video that is played at a first playback rate is duration A; and playback duration of the second video that is played at the first playback rate is duration B. If the duration A is equal to the duration B, it may be considered that the first video and the second video are equal-duration videos, including same quantities of frames of image.

Performing, by using the method for playing a video according to this embodiment, the alternate video playback may include: determining that the alternate video playback needs to be performed when the video switching operation is detected in step S110; determining the first playback progress of the first video if the current playback progress of the first video is an $M^{th}$ frame; and determining the second playback progress according to the first playback progress (that is, the $M^{th}$ frame is already played to) of the first video, where in step S120, obtaining the first playback progress may be determined by reading playback information of the first video from the client.

In step S130, the determining a second playback progress may include: adding one frame to the first playback progress, and then calculating the second playback progress. In this way, step S140 may include playing the second video from an $(M+1)^{th}$ frame of the second video.

Therefore, from a perspective of a user, the alternate video playback is implemented.

Figure 2:
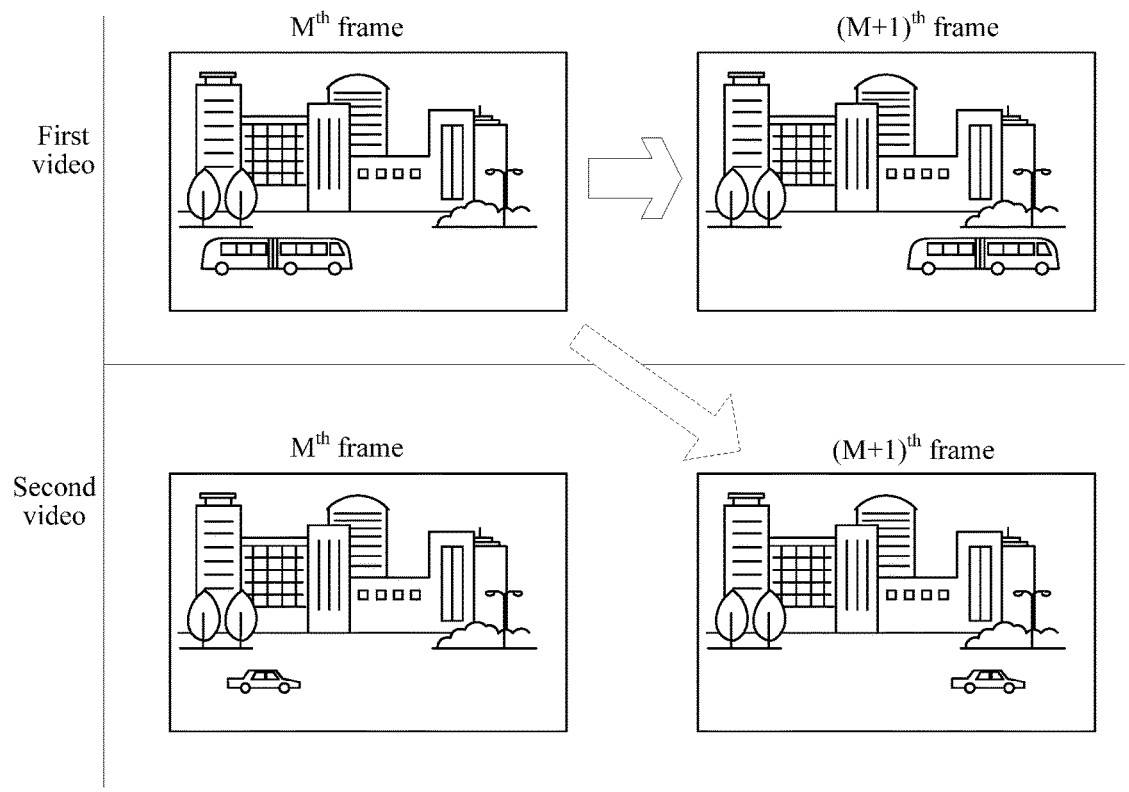
FIG. 2 is a schematic comparison diagram of video playback based on a video switching operation according to an embodiment of the present disclosure.

As shown in FIG. 2, an upper half part in FIG. 2 indicates two frames of image in the first video, which are respectively adjacent $M^{th}$ frame and $(M+1)^{th}$ frame. A lower half part in FIG. 2 indicates two frames of image in the second video, which are respectively adjacent $M^{th}$ frame and $(M+1)^{th}$ frame.

If the client does not receive the video switching operation and the alternate video playback is not performed, the client plays the $M^{th}$ frame and the $(M+1)^{th}$ frame in the first video according to a solid arrow in FIG. 2. If the video switching operation is detected when the client plays the first video to the $M^{th}$ frame, in the method according to this embodiment, after playing the $M^{th}$ frame of the first video, the client switches, according to a dotted arrow in FIG. 2, to play the $(M+1)^{th}$ frame of the second video. Therefore, the first video and the second video are alternated to be played.

It should be noted that, in this embodiment, there may be multiple implementations on the pausing playback of the first video in step S120.

First implementation: An electronic device does not display the first video at a foreground of a displaying unit, so as to implement hiding image information of the first video, and acoustic attenuation processing is performed on audio information of the first video to make the electronic device does not play the audio information of the first video. Therefore, from a perspective of a playback effect, the first video seems to be paused.

Second implementation: The playback of the first video is directly paused, and in this case, the pausing playback of the first video may include: neither decoding nor outputting the image information and the audio information of the first video. However, the electronic device still can download the image information and the audio information of the first video.

That is, the pausing playback of the first video in step S120 may be understood as that, from the perspective of the playback effect of the electronic device, the image information of the first video cannot be seen and the audio information of the first video cannot be heard.

In a specific implementation process, the first video and the second video may be made to videos having an information association relationship. The information association relationship may be embodied as an association between graph objects in the first video and the second video. These videos having an information association may be alternated to be played to achieve another artistic effect such as a strong entertainment effect. The first video is a video in which a person A is running, and the first video further includes much background information. The background information includes buildings and/or plant landscapes on both sides. The second video and the first video include same scenarios, but in the second video, a person having a horse face and a body of a human being is running. Quantities of frames of the two videos are also the same.

When playing the first video, the client detects the video switching operation, so that the client switches to play the second video. After the videos are switched, from the perspective of the user, in an image of the video, the original person A is changed into an image object having a horse face and a body of a human being. In this way, a comic effect and an entertainment effect are achieved.

For another example, the second video does not include the image object having a horse face and a body of a human being, but includes a deformed person A after image editing is performed on the person A. In this way, by using the video switching operation, the client alternates playback of the first video and playback of the second video. When the first video is played, the person A is normal, and when the second video is displayed, the person A may suddenly become fatter, the belly of the person A becomes rounder, and legs of the person A become shorter. Therefore, video playback is more interesting, and an effect of the video playback and watch satisfaction of a user are improved.

For example, in four frames of image in two videos shown in FIG. 2, information such as houses and plants in a frame of image is the same as that in another three frames of image. A difference lies in that: two frames of image in the first video further includes a bus, while two frames of image in the second video further includes a car. If the method for playing a video according to this embodiment is used to play the videos, it is obvious that in a playback process, a user controls, by inputting a corresponding video switching instruction to the client, the bus displayed on the client to change to the car. In this way, controllability of the user to autonomously control video content to be played is improved, a sense of participation of the user is increased, richness of video playback manners is improved, software and hardware resources is better used, and intelligence of the electronic device is improved.

When the videos are played, the first video is displayed in a first display area of the display module; and when the second video is switched to be played based on the video switching operation, similarly, the second video is displayed in the first display area.

Generally, the first video and the second video may also have a coding association. The coding association is embodied in that pieces of information such as a width, a height, and image resolutions of original images corresponding to the first video and the second video are the same, so that when the client encodes and outputs the first video and the second video, a sudden display change is not caused, thereby avoiding an disharmony phenomenon such as sudden amplification or sudden narrowing of an image during video watching.

Certainly, the first video and the second video may also not have the information association or the coding association.

Figure 3:
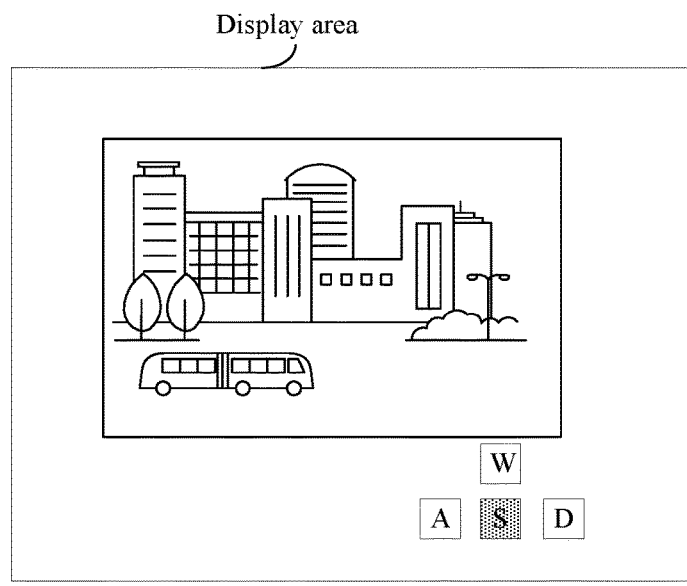
FIG. 3 is a schematic diagram of a display effect of a client using the method for playing a video according to an embodiment.

As shown in FIG. 3, in this embodiment, image information of the first video or the second video is displayed within a display area of the client, and prompt information indicating how a user can input a video switching operation into the client is also displayed. Four letter icons are displayed in the display area shown in FIG. 3, and the letters of the four letter icons are separately A, S, D, and W. Only the letter icon S is shadowed. Obviously, an order of the four letter icons is the same as that of keys corresponding to the four letter icons on a keyboard. In this manner, a user may be prompted that when the first video is played, the display area may be controlled, by pressing the key S, to switch to display the second video. Certainly, the four letters may also be used as controls for detecting the video switching operation. If the client is a mobile phone or a tablet computer, the user may click to display locations of the letter icons, so as to implement inputting the video switching operation into the client; while the client determines, by detecting sensitive coordinates of a corresponding location, whether the video switching operation is detected. If as long as the letter icon S is clicked or the key S is pressed, it is considered that the video switching operation is detected, the letter icon A, the letter icon W, and the letter icon D around may be all considered as other functions of identifying locations of the key S and the letter icons.

A paid video may be classified into an A-type paid video and a B-type paid video. The A-type paid video is generally refers to that a playback service provider provides video playback fee to a video producer; and B-type paid video is generally referred to that a video producer needs to pays video playback fee to a playback service provider. In this embodiment, the first video and the second video may be any of the videos, such as the B-type paid videos. Certainly, in this embodiment, the first video and the second video may also be free videos, such as some videos made by users themselves. A common B-type paid video may be an advertisement. A common free video may include a public service announcement. A common A-type paid video may include a film, a TV series, various variety shows, and the like.

By means of the method for playing a video according to this embodiment, software and hardware resources of the client are better used, and intelligence of the client and user satisfaction are improved.

Method Embodiment 2

As shown in FIG. 1, this embodiment provides a method for playing a video, and the method may include the following.

Step S110: Detecting a video switching operation when a first video is currently being played at a first playback progress.

Step S120: Pausing playback of the first video in response to the detected video switching operation; and obtaining the first playback progress of the first video.

Step S130: Determining a second playback progress of a second video according to the first playback progress, the second video being a video that is different from the first video.

Step S140: Playing the second video according to the second playback progress.

The method further includes: buffering at least two videos, where the at least two videos includes the first video and the second video; and the detecting a video switching operation includes: after the at least two videos are buffered, playing the first video and detecting the video switching operation.

In this embodiment, in the method, before the first video is played, at least two videos are buffered in advance, specifically for example, two videos, three videos, or more than three videos are buffered.

The buffering at least two videos includes obtaining video attribute information of the at least two videos, and the video attribute information includes information related to subsequent video playback such as resource addresses of the videos, data volumes of the videos, video formats, widths, lengths, and heights of video images. A client knows where to search or download the video according to the resource address. Whether playback of the video is safe may be determined according to the data volume of the video. If a data volume of a video is too large, information, such as virus code, that may cause a use potential trouble of an electronic device and a potential trouble of information security may be implanted into corresponding information. Information such as the video format, and the width and the length of the video image can be used to encode or decode obtained video information.

In this embodiment, after the at least two videos are buffered, the first video is started to be played. In this way, when it is detected that the second video is switched to be played, the client does not need to buffer the video again, so that a response delay of video switching playback is shortened. Generally, seamless switching between playback of the first video and playback of the second video can be implemented in a manner of implementing the buffering, that is, phenomena, such as freeze or temporarily pause of video playback, or shortening the response delay, caused because the video is switched to be played are reduced during a video switching process.

In this embodiment, specifically, whether the at least two videos are buffered may be determined by detecting a buffering state tag of each video in a timing detecting area. The buffering state tag may be a ready State attribute. The buffering state tag may be an identifier or a field formed after the client detects, one by one, the video attribute information that needs to be buffered for the video playback. A video playback thread of the client may determine, by detecting the buffer state tag, whether the at least two videos are buffered.

In a process of buffering the at least two videos, some videos may be buffered quickly, and some video may be buffered slowly, so that when a time point is reached, some videos are buffered but some videos are not buffered yet. In the existing technology, after a video is buffered, the client automatically switches to a state for playing the video, and starts to display the video and outputs audio information of the video. However, in this embodiment, after a video is buffered, a state for playing the video is not immediately entered, but it is enforced to wait buffering of videos-to-be-buffered to be completed, and then playback of the video is started; otherwise, a problem of a response delay in a video switching process may be caused.

In addition, it should be noted that when the at least two videos are buffered, if an indication that is input by a user and that indicates pausing the buffering is received, a difference that differs from the existing technology is that the indication is used for the buffering of the at least two videos at the same time. Certainly, in a process of playing the first video and the second video, when an indication that is input by a user and indicates pausing video playback is received, the client performs a corresponding indication to pause operations of playing the first video and the second video, and similarly, the pausing operation is used for the at least two videos at the same time.

Obviously, for an input indication used by the user to control video playback, there are also other unlisted input indications, and these input indications are all used to simultaneously control the at least two videos in this embodiment.

When the at least two videos according to this embodiment actually includes four videos, and the four videos are a video 1, a video 2, a video 3, and a video 4. The videos may be respectively controlled by a letter icon A, a letter icon S, a letter icon W, and a letter icon D shown in FIG. 3. Specifically for example, when it is detected that a control corresponding to the letter icon A detects the video switching operation, the video 1 is switched to be played; when it is detected that a control corresponding to the letter icon S detects the video switching operation, the video 2 is switched to be played; when it is detected that a control corresponding to the letter icon W detects the video switching operation, the video 3 is switched to be played; and when it is detected that a control corresponding to the letter icon D detects the video switching operation, the video 4 is switched to be played. In this case, when an icon in which the letter icon S is located is filled with shadow, the icon may be used to indicate a current playing video. Obviously, in this example, it may be considered that the current playing video is the video 2.

Therefore, in the method for playing a video in this embodiment, during video playback, various types of prompt information may also be displayed, and the prompt information includes information such as current video playback state information and video switching prompt information. The current video playback state information may include information about a video name or an identifier of a current playing video and a video may be switched to be played. The video switching prompt information may include information such as information about how to perform video switching.

Before the buffering at least two videos, the method according to this embodiment may further include: detecting a user indication; and determining the at least two videos need to be buffered according to the user indication.

The user indication may be video identifier information input by a user to the client by means of voice, a keyboard, or touch; or a video determined based on information displayed on the client. The video identifier information may include information such as a name of a video and a resource address of the video.

Method Embodiment 3

As shown in FIG. 1, this embodiment provides a method for playing a video, and the method includes:

Step S110: Detecting a video switching operation when a first video is currently being played at a first playback progress.

Step S120: Pausing playback of the first video in response to the detected video switching operation; and obtaining the first playback progress of the first video.

Step S130: Determining a second playback progress of a second video according to the first playback progress, the second video being a video that is different from the first video.

Step S140: Playing the second video according to the second playback progress.

The method further includes: buffering at least two videos, where the at least two videos includes the first video and the second video; and the detecting a video switching operation includes: playing the first video and detecting the video switching operation after the at least two videos are buffered.

The method further includes: obtaining an operation parameter of the video switching operation; and determining a video in the at least two videos as the second video according to the operation parameter.

In this embodiment, the first video and the second video refer to different videos, but the first video or the second video is not limited to refer one video. When the client buffers more than two videos, in the method according to this embodiment, it also needs to be determined that specifically based on the current video switching operation, video playback switching is performed between two videos. Specifically for example, if the client buffers three videos in advance, which are respectively a video A, a video B, and a video C. It is assumed that the current playing first video is the video A. After receiving the operation parameter of the video switching operation, whether the second video is the video B or the video C is determined according to the operation parameter. Specifically for example, the video switching operation includes a video switching operation detected by a first video switching control and a video switching operation detected by a second video switching control. If the video switching operation is detected by the first video switching operation control, it is consider that the video B is selected as the second video. If the video switching operation is detected by the second video switching operation control, it is considered that the video C is selected as the second video. Therefore, during determining the second video, the second video is determined according a control on which the video switching operation takes effect. Therefore, the client may determine the second video according to different sub-operations corresponding to a video switching operation input by a user.

To make it convenient for a user to perform video switching, generally, when a video is played, switching prompt information is also displayed on a playback interface on which the video is played. The switching prompt information includes prompting that video switching may to be performed, videos to be switched, how to perform the video switching, and the like. Therefore, the user can obtain a better video playback service from the client on a friendlier video playback interface, thereby better using software and hardware resources of the client, and improving user satisfaction on video playback.

Method Embodiment 4

As shown in FIG. 1, this embodiment provides a method for playing a video, and the method includes:

Step S110: Detecting a video switching operation when a first video is currently being played at a first playback progress.

Step S120: Pausing playback of the first video in response to the detected video switching operation; and obtaining the first playback progress of the first video.

Step S130: Determining a second playback progress of a second video according to the first playback progress, the second video being a video that is different from the first video.

Step S140: Playing the second video according to the second playback progress.

In some embodiments, playing the first video includes: drawing image information of the first video on a first canvas; and the playing the second video includes: drawing image information of the second video on the first canvas.

In this embodiment, the first canvas may be a canvas in HTML 5 (e.g., HTML <canvas> element). By drawing the image information of the first video or the image information of the second video to the canvas, the image information of the video may be displayed. In addition, in a process of switching playback of the first video to playback of the second video, a characteristic that image information can be drew by using the canvas may also be used to simply implement rapid switching.

In this embodiment, the canvas is usually applied to a web page, so that video playback can be performed without using a playback plug-in. During the video playback, the client further performs an operation such as displaying the image information drew on the first canvas on a screen or using the image information drew on the first canvas as a projection picture.

During a specific implementation, the client may perform operation processing of video playback on the first video and the second video at the same time, such as buffering the first video and the second video, and downloading the first video and the second video. Finally, the image information of the first video or the second video is drew on the first canvas according to a video needs to be played currently, thereby implementing switching between playback of the first video and playback of the second video.

This embodiment provides a display method applied to the first video and the second video in the present application. During a specific implementation, when playing the first video, the client reads image information of the first video and the second video from a background, and converts the image information to corresponding image data. According to a video needs to be played currently, the corresponding image data is used to control display of each display pixel, so that effects of video playback and rapid video playback switching are achieved.

Method Embodiment 5

As shown in FIG. 1, this embodiment provides a method for playing a video, and the method includes:

Step S110: Detecting a video switching operation when a first video is played.

Step S120: Pausing playback of the first video and obtaining a current progress of the first video if the video switching operation is detected when the first video is played to a first playback progress, the current playback progress of the first video being the first playback progress.

Step S130: Determining a second playback progress of a second video according to the first playback progress, the second video being a video that is different from the first video.

Step S140: Playing the second video according to the second playback progress.

The method further includes: detecting the video switching operation when the second video is played; obtaining a current playback progress of the second video if an acting time of the video switching operation ends, where the current playback progress of the second video is a third playback progress; determining, according to the third playback progress, a fourth playback progress for resuming playing the first video; and playing the first video according to the fourth playback progress.

The method according to this embodiment further includes a method for resuming playback of the first video.

During a specific implementation, the client may resume, according to a detection result of another sub-operation under the video switching operation that is different from switching to play the second video, playback of the first video.

However, in this embodiment, to simply an operation of a user, one video switching operation may be used to implement switching between playback of two videos. When it is detected that the video switching operation is withdrew, it is considered that the acting time ends. If it is detected that the key S is pressed, it is considered that the acting time starts, and if it is detected that the key S is released, it is considered that the acting time ends. Certainly, during a specific implementation, another technology, in which another operation is used to indicate that the acting time ends, may also be used. For example, pressing the key A is used to indicate that the acting time of the video switching operation ends.

In this embodiment, the detecting a video switching operation includes not only detecting whether the video switching operation exists but also detecting the acting time of the video switching operation. The acting time is equal to playback duration of the second video.

Specifically for example, if the client detects that an acting time for playing the second video is one second, when the second video is played, the second video is played from the second playback progress, and playback duration is equal to the acting time one second. In this way, when the acting time of the video switching operation ends, the playback of the first video may be resumed.

Specifically for example, if the video switching operation is detected when the first video is played to an $M^{th}$ frame, the second video is started to be played from an $(M+1)^{th}$ frame of the second video. If it is detected that the acting time ends when the second video is played to an $(M+I)^{th}$ frame, playback of the first video is resumed. In this case, the first video is started to be played from the fourth playback progress, and the fourth playback progress is an $(M+I+1)^{th}$ frame, where I is an integer no less than 1.

Method Embodiment 6

As shown in FIG. 1, this embodiment provides a method for playing a video, and the method includes:

Step S110: Detecting a video switching operation when a first video is currently being played at a first playback progress.

Step S120: Pausing playback of the first video in response to the detected video switching operation; and obtaining the first playback progress of the first video.

Step S130: Determining a second playback progress of a second video according to the first playback progress, the second video being a video that is different from the first video.

Step S140: Playing the second video according to the second playback progress.

An $n^{th}$ frame of image of the first video is a first part of an $n^{th}$ frame of image of a third video; and an $n^{th}$ frame of image of the second video is a second part of the $n^{th}$ frame of image of the third video, where n is an integer no less than 1.

Figure 4:
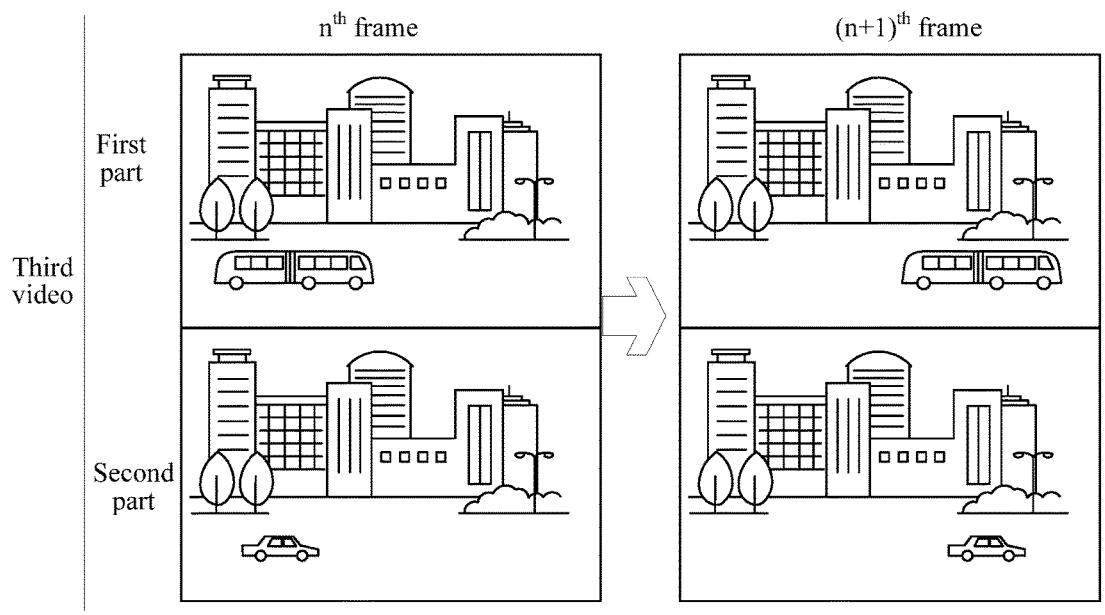
FIG. 4 is a schematic effect diagram of a third video according to an embodiment.

In this embodiment, the first video and the second video may be two parts of a video. In FIG. 4, the first part is an upper half part of the $n^{th}$ frame of image of the third video; and the second part is a lower half part of the $n^{th}$ frame of image of the third video.

Therefore, during video playback switching, the video playback switching is implemented by adjusting the first part or the second part of a frame of image of the third video within a display area of the client.

In FIG. 4, an $(n+1)^{th}$ frame is a next frame of the $n^{th}$ frame of image of the third video. Playing the first video and the second video in this manner looks like alternate playback of two videos but actually is alternate playback of different part of a same video.

Method Embodiment 7

As shown in FIG. 1, this embodiment provides a method for playing a video, and the method includes:

Step S110: Detecting a video switching operation when a first video is currently being played at a first playback progress.

Step S120: Pausing playback of the first video in response to the detected video switching operation; and obtaining the first playback progress of the first video.

Step S130: Determining a second playback progress of a second video according to the first playback progress, the second video being a video that is different from the first video.

Step S140: Playing the second video according to the second playback progress.

The method is applied to a client including a display module.

The first video is displayed in a first area of a first display page.

The second video is displayed in a second area of the first display page.

The playing the second video includes: controlling the display module to display the second area, and hide the first area or use specified information to cover the first area.

When the client plays a video, the video is played on a corresponding playback interface. The playback interface may be the first display page.

In this embodiment, switching between the first video and the second video is implemented by controlling the display module to display the first area or the second area.

The hiding the first area may be that the display module does not display the first area. In this case, generally, an entire display area required by the first display page is a first area; while a display area of the display module of the client may be a second area, where the first area may be greater than the second area. When the first area is not displayed, the display module moves the first area outside of the display module.

In addition, the first area may be covered in a covering manner, and the display module is controlled to display the second area. For example, display content covering the second area is used to cover the first area, and the second area is displayed in a display area in which the first area is displayed, so that from a perspective of a user, switching display of two videos are implemented.

This embodiment provides a display method of video switching that is different from that in the foregoing embodiment, thereby better using software and hardware resources of the client, and improving intelligence of the client.

Method Embodiment 8

As shown in FIG. 1, this embodiment provides a method for playing a video, and the method includes:

Step S110: Detecting a video switching operation when a first video is currently being played at a first playback progress.

Step S120: Pausing playback of the first video in response to the detected video switching operation; and obtaining the first playback progress of the first video.

Step S130: Determining a second playback progress of a second video according to the first playback progress, the second video being a video that is different from the first video.

Step S140: Playing the second video according to the second playback progress.

Step S130 may include: determining a playback progress conversion ratio according to a first playback duration of the first video and a second playback duration of the second video; and determining the second playback progress according to the playback progress conversion ratio and the first playback progress.

Specifically for example, playback duration of the first video according to a first playback rate is first playback duration T1, and playback duration of the second video according to a second playback rate is second playback duration T2.

The playback progress conversion ratio may be equal to T2/T1.

If the first playback progress is S1 and the second playback progress is S2, S2=1+S1*T2/T1.

Herein, a playback progress corresponding to S1 or S2 is a frame sequence of a frame of image that is currently played to, and the frame sequence herein may be, for example, the $M^{th}$ frame in the foregoing embodiment.

By means of this conversion manner, it may be easily determined that which frame of the second video is started to be played when the second video is switched to be played.

Specifically for example, the first playback duration of the first video may be 1000 seconds; and the second playback duration of the second video may be 100 seconds. If the first video is played to the $100^{th}$ frame when the video switching operation is detected, the second video is played from the $(1+100*100/1000)^{th}$ frame.

Certainly, this embodiment provides a manner about how to determine the second playback progress, and a specific implementation is not limited to the manner. Specifically for example, the client may also store mapping relationship information of an operation of switching between the first video and the second video. An A frame and a B frame are recorded in the mapping relationship information. The A frame is a frame of image in the first video, and the B frame is a frame of image in the second video. If the video switching operation is detected at the A frame, the second video is controlled to be played from the B frame, and vice versa. When a video is buffered, the mapping relationship information may be obtained from a service platform providing the video at the same time.

Certainly, a method for determining the second playback progress according to this embodiment in turn is also obviously applied to determining a fourth playback progress.

To sum up, this embodiment provides a method for determining the second playback progress, and an advantage is that the method is implemented easily and rapidly.

Device Embodiment 1

Figure 5:
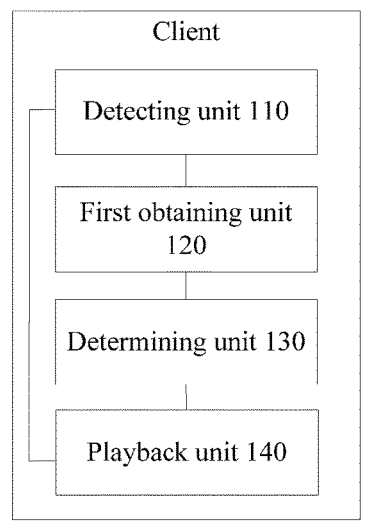
FIG. 5 is a schematic structural diagram of a client according to an embodiment of the present disclosure.

As shown in FIG. 5, this embodiment provides a client, and the client includes: a detecting unit 110, configured to detect a video switching operation when a first video is currently being played at a first playback progress; a first obtaining unit 120, configured to pause playback of the first video in response to the detected video switching operation; and obtain the first playback progress of the first video; a determining unit 130, configured to determine a second playback progress of a second video according to the first playback progress, the second video being a video that is different from the first video; and a playback unit 140, configured to play the second video according to the second playback progress.

The client according to this embodiment may be any electronic device playing a video, specifically for example, a device such as a mobile phone, a tablet computer, a notebook computer, a desktop computer or a wearable device.

The detecting unit 110 may be a structure including various human computer interaction interfaces, such as a keyboard, a mouse, a touchscreen, a floating touchscreen, or a voice interaction interface. These human computer interaction interfaces can detect the video switching operation.

Specific structures of the first obtaining unit 120 and the determining unit 130 may correspond to a processor or a processing chip in the client. The processor or the processing chip implements, by performing executable code, determination of the first playback progress and the second playback progress.

The processor may include various structures, having an information processing function (e.g., playing a video), such as an application processor (AP), a central processing unit (CPU), a micro processor (MCU), a digital signal processor (DSP), or a programmable array (PLC).

The playback unit 140 includes a display module. The display module may include various types of screens, for example, a display structure such as a liquid crystal display, a projection screen, or an electronic ink screen. Generally, the playback unit 140 further includes a voice output structure, for example, a structure such as a loudspeaker, which is configured to output audio information in a video.

For video information of the first video and the second video, refer to the corresponding method embodiment, and details are not described herein again. In conclusion, the client according to this embodiment can be configured to perform the method for playing a video in the method embodiment, and is characterized by high software and hardware resource usage of the client, high intelligence of the client, and high user satisfaction.

Device Embodiment 2

As shown in FIG. 5, this embodiment provides a client, and the client includes: a detecting unit 110, configured to detect a video switching operation when a first video is currently being played at a first playback progress; a first obtaining unit 120, configured to pause playback of the first video in response to the detected video switching operation; and obtain the first playback progress of the first video; a determining unit 130, configured to determine a second playback progress of a second video according to the first playback progress, the second video being a video that is different from the first video; and a playback unit 140, configured to play the second video according to the second playback progress.

The client further includes: a buffering unit, configured to buffer at least two videos, where the at least two videos includes the first video and the second video; and the playback unit 140, configured to play the first video and detect the video switching operation after the at least two videos are buffered.

The buffering unit according to this embodiment may include a communications interface, which is configured to receive attribute information of the at least two videos from another electronic device. The attribute information may include information such as a resource address, a video format, a video data volume, and a width and a length of the video image.

Similarly, the buffering unit may also be a processor or a processing unit, which may obtain the attribute information only from the client locally.

The playback unit 140 according to this embodiment plays the first video after the buffering unit buffers the attribute information, so that when the first video and the second video are switched subsequently, a delay of video playback switching can be reduced.

Device Embodiment 3

As shown in FIG. 5, this embodiment provides a client, and the client includes: a detecting unit 110, configured to detect a video switching operation when a first video is currently being played at a first playback progress; a first obtaining unit 120, configured to pause playback of the first video in response to the detected video switching operation; and obtain the first playback progress of the first video; a determining unit 130, configured to determine a second playback progress of a second video according to the first playback progress, the second video being a video that is different from the first video; and a playback unit 140, configured to play the second video according to the second playback progress.

The client further includes: a buffering unit, configured to buffer at least two videos, where the first video is one of the at least two videos, and the second video is another one of the at least two videos; and the playback unit 140, configured to play the first video and detect the video switching operation after the at least two videos are buffered.

The client further includes: a second obtaining unit, configured to obtain an operation parameter of the video switching operation; and a selecting unit, configured to determine a video in the at least two videos as the second video according to the operation parameter.

In this embodiment, the second obtaining unit is connected to the first obtaining unit, and the second obtaining unit is configured to parse a signal detected by the detecting unit, and determine the operation parameter.

Similarly, the selecting unit and the second obtaining unit may also be a processor or a processing chip, which determines, by executing code, which one of the at least two videos is the second video.

The client according to this embodiment may not only be configured to perform video playback switching between two videos, but also be applied to playback switching among more than two videos. Obviously, the client has advantages of strong video playback switching function, and high resource usage and high intelligence of the client.

Device Embodiment 4

As shown in FIG. 5, this embodiment provides a client, and the client includes: a detecting unit 110, configured to detect a video switching operation when a first video is currently being played at a first playback progress; a first obtaining unit 120, configured to pause playback of the first video in response to the detected video switching operation; and obtain the first playback progress of the first video; a determining unit 130, configured to determine a second playback progress of a second video according to the first playback progress, the second video being a video that is different from the first video; and a playback unit 140, configured to play the second video according to the second playback progress.

The playback unit 140 is configured to draw image information of the first video on a first canvas; or draw image information of the second video on the first canvas.

The playback unit 140 according to this embodiment specifically uses a manner of drawing the image information to implement playback of the first video and the second video. The first canvas may be a HTML canvas. The client according to this embodiment is specifically applied to network video playback, such as network video playback in a web page or a network application. A common network video may be understood as a video transmitted by using an Internet formed by a mobile network and a computer network.

The playback unit 140 according to this embodiment is a video playback structure implementing video playback by drawing the first video or the second video to the first canvas, and the playback unit is characterized by a simple structure and easy implementation.

Device Embodiment 5

As shown in FIG. 5, this embodiment provides a client, and the client includes: a detecting unit 110, configured to detect a video switching operation when a first video is currently being played at a first playback progress; a first obtaining unit 120, configured to pause playback of the first video in response to the detected video switching operation; and obtain the first playback progress of the first video; a determining unit 130, configured to determine a second playback progress of a second video according to the first playback progress, the second video being a video that is different from the first video; and a playback unit 140, configured to play the second video according to the second playback progress.

The playback unit 140 is configured to draw image information of the first video on a first canvas; or draw image information of the second video on the first canvas.

The detecting unit 110 is further configured to detect the video switching operation when the second video is played.

The first obtaining unit 120 is further configured to obtain a current playback progress of the second video if an acting time of the video switching operation ends, where the current playback progress of the second video is a third playback progress.

The determining unit 130 is further configured to determine, according to the third playback progress, a fourth playback progress for resuming playing the first video.

The playback unit 140 is further configured to play the first video according to the fourth playback progress.

In this embodiment, when the acting time of the video switching operation ends, the client resumes to play the first video. In this embodiment, the client multiplexes the detecting unit 110 to detect the video switching operation when the second video is played, multiplexes the first obtaining unit to obtain the third playback progress, and uses the determining unit to determine the fourth playback progress. Therefore, the client is better used to perform playback switching between the first video and the second video.

As shown in FIG. 5, this embodiment provides a client, and the client includes: a detecting unit 110, configured to detect a video switching operation when a first video is currently being played at a first playback progress; a first obtaining unit 120, configured to pause playback of the first video in response to the detected video switching operation; and obtain the first playback progress of the first video; a determining unit 130, configured to determine a second playback progress of a second video according to the first playback progress, the second video being a video that is different from the first video; and a playback unit 140, configured to play the second video according to the second playback progress.

An $n^{th}$ frame of image of the first video is a first part of an $n^{th}$ frame of image of a third video; and an $n^{th}$ frame of image of the second video is a second part of the $n^{th}$ frame of image of the third video, where n is an integer no less than 1.

In this embodiment, the first video and the second video are actually two different parts of the third video. From a perspective of a user, switching or alternate playback between two videos is implemented, but actually the switching or the alternate playback may be performed on different parts of a same video. Therefore, controllability of the user on content-to-be-played of the video is also enhanced, use satisfaction of the user and a sense of participation of the user are also improved.

Device Embodiment 6

As shown in FIG. 5, this embodiment provides a client, and the client includes: a detecting unit 110, configured to detect a video switching operation when a first video is currently being played at a first playback progress; a first obtaining unit 120, configured to pause playback of the first video in response to the detected video switching operation; and obtain the first playback progress of the first video; a determining unit 130, configured to determine a second playback progress of a second video according to the first playback progress, the second video being a video that is different from the first video; and a playback unit 140, configured to play the second video according to the second playback progress.

The playback unit includes a display module.

The first video is displayed in a first area of a first display page.

The second video is displayed in a second area of the first display page.

The playback unit 140 is specifically configured to control the display module to display the second area, and hide the first area or use specified information to cover the first area.

The display module may include various types of screens. For description related to the screen, refer to the foregoing embodiment, and details are not described herein again.

In this embodiment, the playback unit 140 implements, by controlling an area displayed by the display module or controlling displayed content on a display page, playback switching between the first video and the second video.

A structure of the playback unit 140 according to this embodiment is characterized by a simple structure.

Device Embodiment 7

As shown in FIG. 5, this embodiment provides a client, and the client includes: a detecting unit 110, configured to detect a video switching operation when a first video is currently being played at a first playback progress; a first obtaining unit 120, configured to pause playback of the first video in response to the detected video switching operation; and obtain the first playback progress of the first video; a determining unit 130, configured to determine a second playback progress of a second video according to the first playback progress, the second video being a video that is different from the first video; and a playback unit 140, configured to play the second video according to the second playback progress.

Playback duration of the first video is first playback duration.

Playback duration of the second video is second playback duration.

The determining unit 130 is configured to determine a playback progress conversion ratio according to the first playback duration and the second playback duration, and determine the second playback progress according to the playback progress conversion ratio and the first playback progress.

The determining unit 130 according to this embodiment may include a calculator or a processor having a calculation function, which can calculate the conversion ratio, and calculates the second playback progress according to the conversion ratio, so that the second playback progress can be easily determined, and an advantage of the determining unit 130 is a simple structure.

During a specific implementation, the determining unit 130 may further include a storage module. The storage module may correspond to a storage medium in the client. The storage medium is configured to store the mapping relationship information according to Method Embodiment 8. The determining unit 130 may further include a processor. The processor is configured to determine the second playback progress by querying the mapping relationship information, so that the client can also implement playback switching between the first video and the second video, and the client is characterized by a simple structure and high intelligence of the client.

In the several embodiments provided in the present application, it should be understood that the disclosed device and method may be implemented in other manners. For example, the described device embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between constituent parts may be implemented by means of some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may be used as a unit separately, or two or more units are integrated into one unit. The integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a portable storage device, a read-only memory (ROM), a random access memory (RAM), a magnetic disk, or an optical disc.

An embodiment of the present disclosure further provides a computer storage medium, the computer storage medium storing a computer executable instruction, and the computer executable instruction being configured to perform at least one of the methods for playing a video provided in the method embodiments, for example, performing the method for playing a video as shown in FIG. 1. The computer storage medium according to this embodiment may be one of the foregoing storage mediums, and the computer storage medium may be selected as a non-instant storage medium, such as a non-volatile storage medium.

The foregoing descriptions are merely specific embodiments of the present invention, but are not intended to limit the protection scope of the present disclosure. Any modification made according to the principle of the present disclosure should fall within the protection scope of the present disclosure.

What is claimed is:

1. A method for playing a video, comprising:
    detecting a video switching operation when a first video is currently being played at a first playback progress;
    pausing playback of the first video in response to the detected video switching operation;
    obtaining the first playback progress of the first video, the first playback progress including a first frame sequence number of the first video corresponding to a first frame played when the video switching operation is detected;
    determining a second playback progress of a second video according to the first playback progress, the second playback progress including a second frame sequence number of the second video associated with the first frame sequence number of the first video, the second video being a video different from the first video; and
    playing the second video according to the second playback progress,
    wherein determining the second playback progress of the second video comprises:
    determining a playback progress conversion ratio based on a first total playback duration T1 of the first video and a second total playback duration of the second video T2, the first total playback duration being different from the second total playback duration; and
    determining the second frame sequence number of the second video using the playback progress conversion ratio and the first frame sequence number S1 of the first video, wherein the second frame sequence number equals 1+S1*T2/T1.

2. The method according to claim 1, further comprising:
    buffering at least two videos, wherein the at least two videos includes the first video and the second video; and
    when some of the at least two videos is buffered and buffering of a remaining video of the at least two videos is not completed, waiting for the remaining video to complete buffering before playing the first video,
    wherein the detecting a video switching operation comprises:
    after the at least two videos are buffered, playing the first video and detecting the video switching operation.

3. The method according to claim 2, further comprising:
    obtaining an operation parameter of the video switching operation; and
    determining a video in the at least two videos as the second video according to the operation parameter.

4. The method according to claim 1, wherein
    playing the first video further comprises: drawing image information of the first video on a first canvas; and
    playing the second video further comprises: drawing image information of the second video on the first canvas.

5. The method according to claim 1, further comprising:
    detecting the video switching operation when the second video is being played;
    obtaining a current playback progress of the second video if an acting time of the video switching operation ends, wherein the current playback progress of the second video is a third playback progress;
    determining, according to the third playback progress, a fourth playback progress for resuming playing the first video; and
    playing the first video according to the fourth playback progress.

6. The method according to claim 1, wherein:
    an $n^{th}$ frame of image of the first video is a first part of an $n^{th}$ frame of image of a third video; and
    an $n^{th}$ frame of image of the second video is a second part of the $n^{th}$ frame of image of the third video, wherein n is an integer no less than 1.

7. The method according to claim 1, wherein:
    the method is applied to a client comprising a display module;
    the first video is displayed in a first area of a first display page;
    the second video is displayed in a second area of the first display page; and
    the playing the second video comprises:
    controlling the display module to display the second area, and hide the first area or use specified information to cover the first area.

8. The method according to claim 1, wherein the determining a second playback progress of a second video according to the first playback progress comprises:
    determining a playback progress conversion ratio according to a first playback duration of the first video and a second playback duration of the second video; and
    determining the second playback progress according to the playback progress conversion ratio and the first playback progress.

9. A client terminal, comprising:
    a memory; and
    a processor coupled to the memory and configured to:
    detect a video switching operation when a first video is currently being played at a first playback progress;

pause playback of the first video in response to the detected video switching operation;

obtain the first playback progress of the first video, the first playback progress including a first frame sequence number of the first video corresponding to a first frame played when the video switching operation is detected;

determine a second playback progress of a second video according to the first playback progress, the second playback progress including a second frame sequence number of the second video associated with the first frame sequence number of the first video, the second video being a video different from the first video; and play the second video according to the second playback progress, wherein determining the second playback progress of the second video comprises:

determining a playback progress conversion ratio based on a first total playback duration T1 of the first video and a second total playback duration of the second video T2, the first total playback duration being different from the second total playback duration; and determining the second frame sequence number of the second video using the playback progress conversion ratio and the first frame sequence number S1 of the first video, wherein the second frame sequence number equals 1+S1*T2/T1.

10. The client terminal according to claim 9, wherein the processor is further configured to:

buffer at least two videos, wherein the at least two videos includes the first video and the second video;

when some of the at least two videos is buffered and buffering of a remaining video of the at least two videos is not completed, wait for the remaining video to complete buffering before playing the first video; and play the first video and detect the video switching operation after the at least two videos are buffered.

11. The client terminal according to claim 10, wherein the processor is further configured to:

obtain an operation parameter of the video switching operation; and determine a video in the at least two videos as the second video according to the operation parameter.

12. The client terminal according to claim 9, wherein the processor is further configured to draw image information of the first video on a first canvas when the first video is being played; and draw image information of the second video on the first canvas when the second video is being played.

13. The client terminal according to claim 9, wherein the processor is further configured to:

detect the video switching operation when the second video is being played;

obtain a current playback progress of the second video if an acting time of the video switching operation ends, wherein the current playback progress of the second video is a third playback progress;

determine, according to the third playback progress, a fourth playback progress for resuming playing the first video; and play the first video according to the fourth playback progress.

14. The client terminal according to claim 9, wherein:

an $n^{th}$ frame of image of the first video is a first part of an $n^{th}$ frame of image of a third video; and an $n^{th}$ frame of image of the second video is a second part of the $n^{th}$ frame of image of the third video, wherein n is an integer no less than 1.

15. The client terminal according to claim 9, further comprising a display circuit, wherein:

the first video is displayed in a first area of a first display page;

the second video is displayed in a second area of the first display page; and the processor is configured to control the display circuit to display the second area, and hide the first area or use specified information to cover the first area.

16. The client terminal according to claim 9, wherein the processor is further configured to:

determine a playback progress conversion ratio according to a first playback duration of the first video and a second playback duration of the second video, and determine the second playback progress according to the playback progress conversion ratio and the first playback progress.

17. A non-transitory storage medium storing computer executable instructions executable by at least one processor to perform:

detecting a video switching operation when a first video is currently being played at a first playback progress;

pausing playback of the first video in response to the detected video switching operation;

obtaining the first playback progress of the first video, the first playback progress including a first frame sequence number of the first video corresponding to a first frame played when the video switching operation is detected;

determining a second playback progress of a second video according to the first playback progress, the second playback progress including a second frame sequence number of the second video associated with the first frame sequence number of the first video, the second video being a video different from the first video; and playing the second video according to the second playback progress, wherein determining the second playback progress of the second video comprises:

determining a playback progress conversion ratio based on a first total playback duration T1 of the first video and a second total playback duration of the second video T2, the first total playback duration being different from the second total playback duration; and determining the second frame sequence number of the second video using the playback progress conversion ratio and the first frame sequence number S1 of the first video, wherein the second frame sequence number equals 1+S1*T2/T1.

* * * * *